(12) United States Patent
Zhang et al.

(10) Patent No.: US 10,801,560 B2
(45) Date of Patent: Oct. 13, 2020

(54) FLUID ROUTING WITHIN A CLUTCH

(71) Applicant: Ford Global Technologies, LLC, Dearborn, MI (US)

(72) Inventors: Dengfu Zhang, Northville, MI (US); Norman Jerry Bird, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 12 days.

(21) Appl. No.: 16/139,122

(22) Filed: Sep. 24, 2018

(65) Prior Publication Data

US 2020/0096059 A1 Mar. 26, 2020

(51) Int. Cl.
*F16D 41/12* (2006.01)

(52) U.S. Cl.
CPC .......... *F16D 41/12* (2013.01); *F16D 2300/06* (2013.01)

(58) Field of Classification Search
None
See application file for complete search history.

(56) References Cited

U.S. PATENT DOCUMENTS

| 7,743,678 B2 | 6/2010 | Wittkopp et al. |
| 8,042,670 B2 | 10/2011 | Bartos et al. |
| 2007/0131509 A1* | 6/2007 | Kimes ..................... F16D 41/12 |
| | | 192/46 |
| 2016/0201740 A1* | 7/2016 | Kimes ..................... F16D 27/14 |
| | | 192/46 |

* cited by examiner

*Primary Examiner* — Timothy Hannon
(74) *Attorney, Agent, or Firm* — Vincent Mastrogiacomo; Brooks Kushman, P.C.

(57) ABSTRACT

A one-way clutch is provided. The one-way clutch may include an inner race and an outer race that may be provided with a pocket defining a leading edge and a trailing edge that may define a fluid passage. The one-way clutch may also include a rocker. The rocker may be disposed between the inner and outer races and include first and second ends. The first end may define first cross-sectional area and the second end, and the leading edge may define a second cross-sectional area that is less than the first.

17 Claims, 4 Drawing Sheets

FLUID ROUTING WITHIN A CLUTCH

TECHNICAL FIELD

The present disclosure relates to automotive transmissions, in particular those that include a one-way clutch mechanism.

BACKGROUND

A one-way clutch generally includes an inner race coupled to a first component and an outer race coupled to a second component. In some applications, one of the components is stationary while in other applications, both components are rotatable. The one-way clutch engages to transfer torque between the inner race and outer race to prevent relative rotation between the first and second components is in a first direction and disengages to free wheel when the relative rotation is in a second direction. One type of one-way clutch utilizes a pivotable strut that moves from a disengaged position not in contact with the inner race, to an engaged position in contact with the inner race. The one-way clutch generally includes a lubricant such as oil that flows through the one-way clutch to facilitate smooth actuation and longevity of the components of the one-way clutch.

Some one-way clutches are switchable between a first state in which the strut is held in the disengaged position allowing relative rotation in both directions and a second state in which the strut moves to the engaged position in response to slight relative rotation in the first direction. One-way clutches for vehicles can operate up to speeds exceeding 7,500 revolutions-per-minutes. When a strut within a one-way clutch moves to the engaged position at high speeds the one-way clutch can experience issues.

SUMMARY

According to one embodiment of this disclosure, a one-way clutch is provided. The one-way clutch may include an inner race, an outer race, and a rocker. The inner race may be rotatable in a rotational direction. The outer race may surround the inner race and be provided with a pocket that may define a leading edge and a trailing edge, each associated with the rotational direction. The rocker may be pivotally connected to the outer race. The outer race may include a first end that may be adjacent to the trailing edge and a second end adjacent to the leading edge. The trailing edge may define a fluid passage.

According to another embodiment of this disclosure, a one-way clutch is provided. The inner race may be provided with an outer circumferential surface. The inner circumferential surface may define a tooth and be rotatable in a rotational direction. The one-way clutch may also include an outer race that may define an inner circumferential surface, arranged concentrically with the inner race, provided with a pocket. The pocket and the inner circumferential surface may define a leading edge and a trailing edge that are each associated with the rotational direction. A rocker may be pivotally connected to the outer race at a pivot point. The rocker may include a first end disposed on one side of the pivot point, adjacent to the trailing edge, and a second end disposed on the other side of the pivot point adjacent to the lead edge. The pocket and the first end of the rocker may define a space configured to receive fluid, and the trailing edge may define a fluid notch that may be configured to facilitate fluid flow from the inner race to the space.

According to another embodiment of this disclosure, a one-way clutch is provided. The one-way clutch may include an inner race and an outer race that may be provided with a pocket defining a leading edge and a trailing edge that may define a fluid passage. The one-way clutch may also include a rocker. The rocker may be disposed between the inner and outer races and include first and second ends. The first end may define first cross-sectional area and the second end, and the leading edge may define a second cross-sectional area that is less than the first.

DETAILED DESCRIPTION

Figure 1:
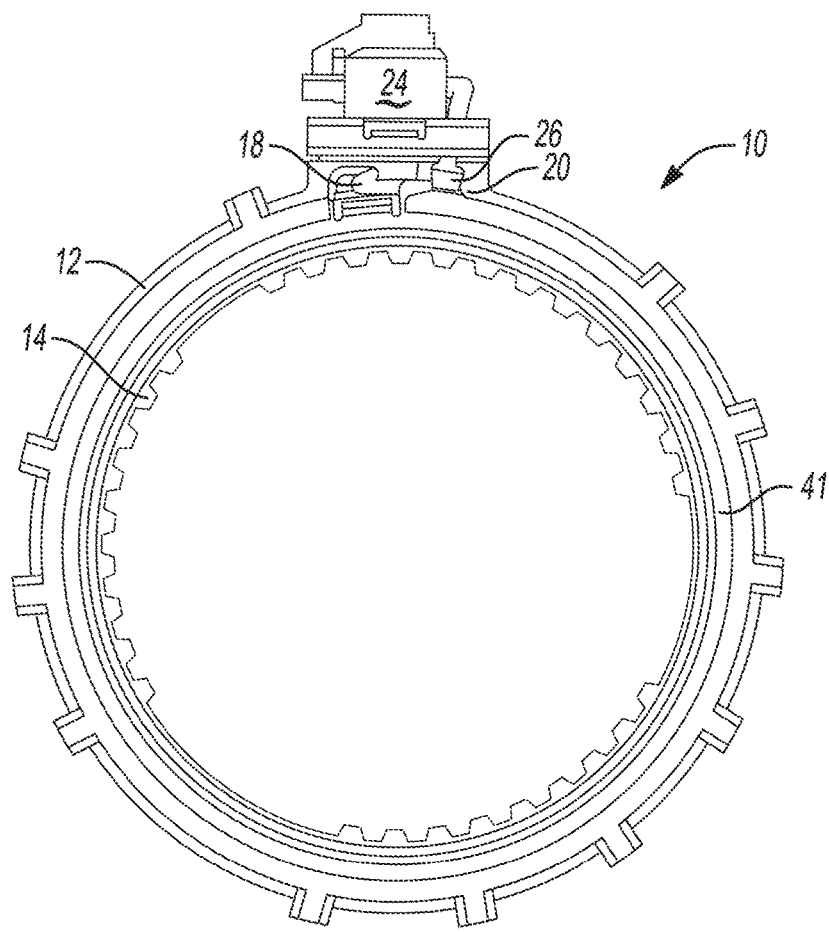
FIG. 1 is a plan view of an exemplary one-way clutch assembly.
Figure 1A:
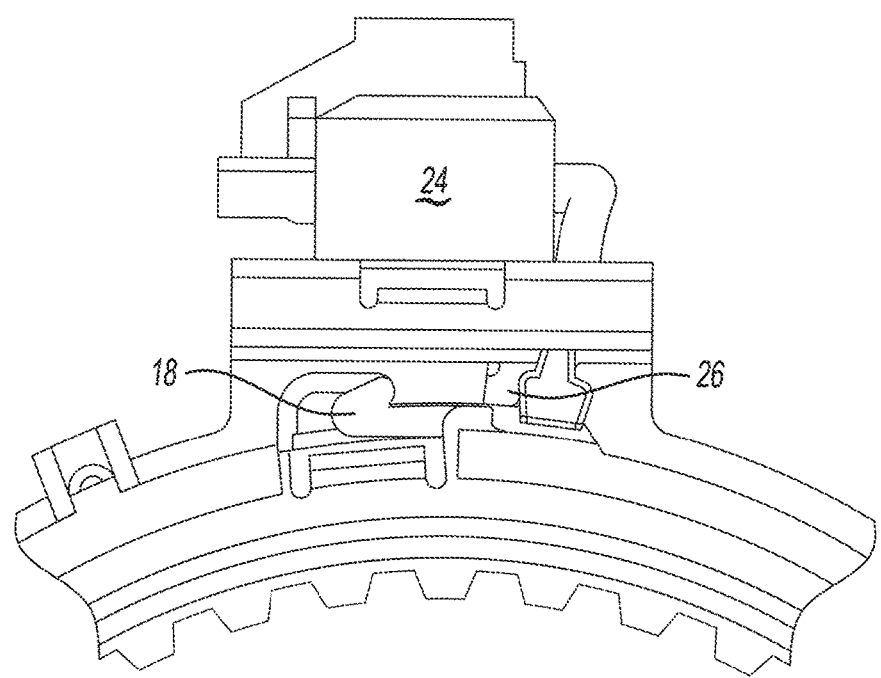
FIG. 1A is a detailed view of a portion of the one-way clutch assembly taken along the lines A-A.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIG. 1 through FIG. 6, a selectable one-way clutch 10 is provided. The one-way clutch may include an inner race 14 provided with an outer circumferential surface 15. The outer circumferential surface 15 of the inner race 14 may define one or more teeth 16. The inner race 14 may be arranged concentrically with an outer race 12. The outer race 12 may define an inner periphery, such as an inner circumferential surface 12a and an outer periphery or outer surface 12b. The outer race may include a raised section 20 that defines a pocket 22. The pocket 22 may define a pair of edges that are each associated with a rotational direction of the inner race 14 and tooth 16. In one or more embodiments, the edge that the tooth 16 first moves by may be referred to as a leading edge 22a and the edge that the tooth 16 passes by after the leading edge 22a may be referred to a trailing edge 22b.

The tooth 16 may include a front face, such as a lead face 16a, and a rear face, such as a trailing face 16b. The term lead refers to the directional rotation of the inner race 14 with respect to a fixed point on the outer race 12. Meaning, when the inner race 14 rotates, (clockwise or counterclockwise) the front face 16a moves by the fixed point (e.g., rocker 18, sensor 26, solenoid 24) before the rear face 16b before the front face 16a moves by the fixed point. The front face may extend in a direction that orthogonal to the axis of rotation.

A rocker, such as a strut 18, may be partially disposed within the pocket 22 and pivotally connected to the outer race 12 at a pivot point $X_1$. The strut 18 may include a first end or proximal end 18a disposed on one side of the pivot point $X_1$ and a distal end or portion 18a that is disposed on the other side of the pivot point $X_1$. In one or more embodiments, the proximal end 18a is positioned adjacent to the trailing edge 22b and the distal end 18b may be adjacent to the lead edge 22a. During operation a solenoid 24 may be actuated to pivot the strut 18 from a disengaged position or tucked position to an engaged position. In engaged position, the distal end 18b of the strut 18 may engage one or more of the teeth 16 of the inner race 14.

A compression spring 19 (FIG. 6) may disposed within the outer race 12 to engage the proximal end 18a of the strut 18. The compression spring 19 may bias the proximal end 18a so that strut 18 is biased towards the disengaged position. The solenoid 24 may include a plunger (not shown) that engages the strut 18 so that a distal end 18b of the strut 18 is moved from the disengaged position to the engaged position. The solenoid 24 may apply a force that is sufficient to overcome the force of the compression spring 19.

Fluid such as oil or another suitable lubricant may be provided to the one-way clutch 10 for smooth actuation of the one-way clutch 10. As fluid flows through the one-way clutch 10, a pressure differential may develop along certain portions of the strut 18. One or more of the pressure differentials may act upon the strut 18 and inadvertently deploy or actuate the strut 18. For example, a pressure differential below a bottom surface of the strut 18, near the proximal end 18a, may cause inadvertent actuation of the strut 18. As another example, a pressure differential above an upper surface of the strut 18, near the distal end 18b, may also cause inadvertent actuation of the strut.

Controlling the flow of the fluid may mitigate the occurrence of pressure differentials caused by the fluid flowing through the one-way clutch assembly 10. In one or more embodiments, the trailing edge 22b may define a fluid passage, such as a fluid notch 40. The fluid notch 40 may extend from the inner circumferential surface 12a to a space or chamber 23 defined by the pocket 22. The fluid notch 40 defined by the trailing edge 22b may facilitate flow of fluid from the bottom surface of the strut 18, near the proximal end 18a, to the chamber 23. The fluid notch 40 and the proximal end 18a may define a first cross-sectional area $A_4$ that is configured to mitigate fluid pressure at the bottom surface of the strut 18, near the proximal end 18a.

In one or more embodiments, the fluid notch 40 may define a rectangular periphery. Alternatively, other suitable shapes (e.g., semi-circular, square) may be used.

In one or more embodiments, a blocking member such as a sensor (e.g., proximity sensor) 26 may be disposed within the outer race 12 so that it is adjacent to the distal end 18b of the strut 18. The sensor may define the leading edge 22a. A distal end 18b and the leading edge 22a may define a second cross-sectional area $A_2$ that is less than the first cross-sectional area $A_4$. The second cross-sectional area $A_2$ may mitigate fluid pressure at the top surface of the strut 18, near the distal end 18b.

In one or more embodiments, the sensor 26 may be a hall sensor, visual sensor, electromagnetic sensor.

Figure 2:
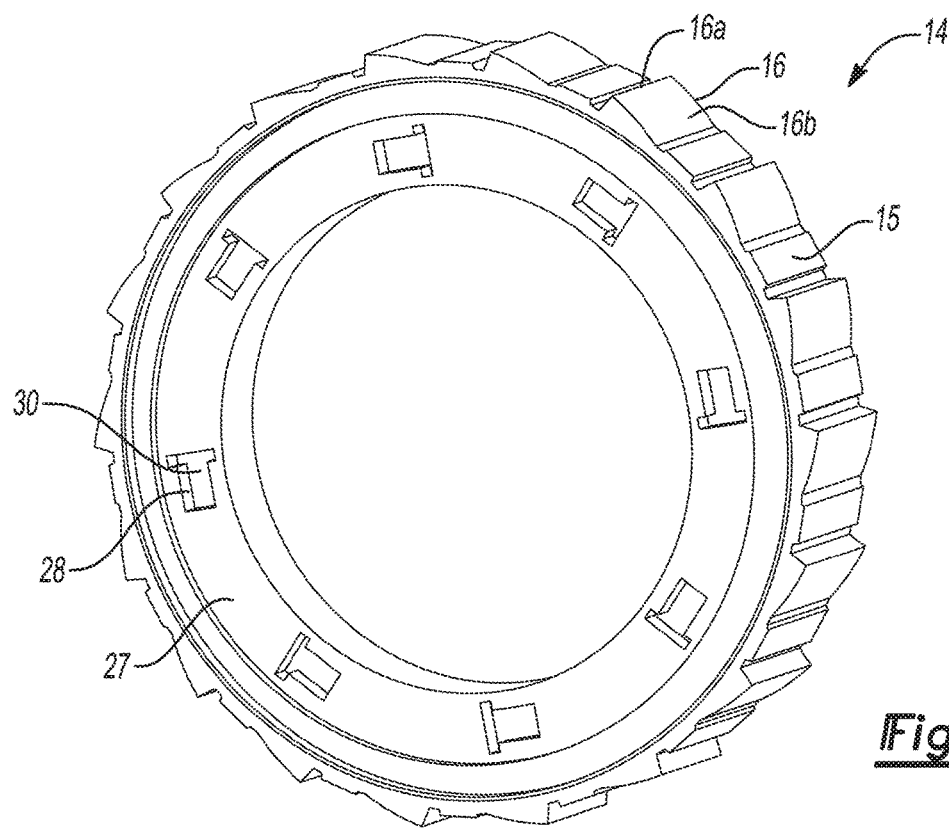
FIG. 2 is a perspective view of an exemplary inner race assembly.

FIG. 2 illustrates a perspective view of the inner race 14. The inner race 14 includes an outer peripheral surface 14a and an inner peripheral surface 14b. The inner race 14 further defines an interior axial face 27 that is orthogonal to the axis of rotation A. The interior axial face 27 may define a plurality of recessed pockets 28. In one or more embodiments, the interior axial face 27 may be a recessed surface. Axial struts or axial rockers 30 may be disposed within each of the recessed pockets 28. The axial struts or axial rockers may be pivotally connected to the inner race 14 and configured to actuate along the axis of rotation to cause separation between the interior axial face 27 and an exterior axial plate 41 (FIG. 1).

Figure 3:
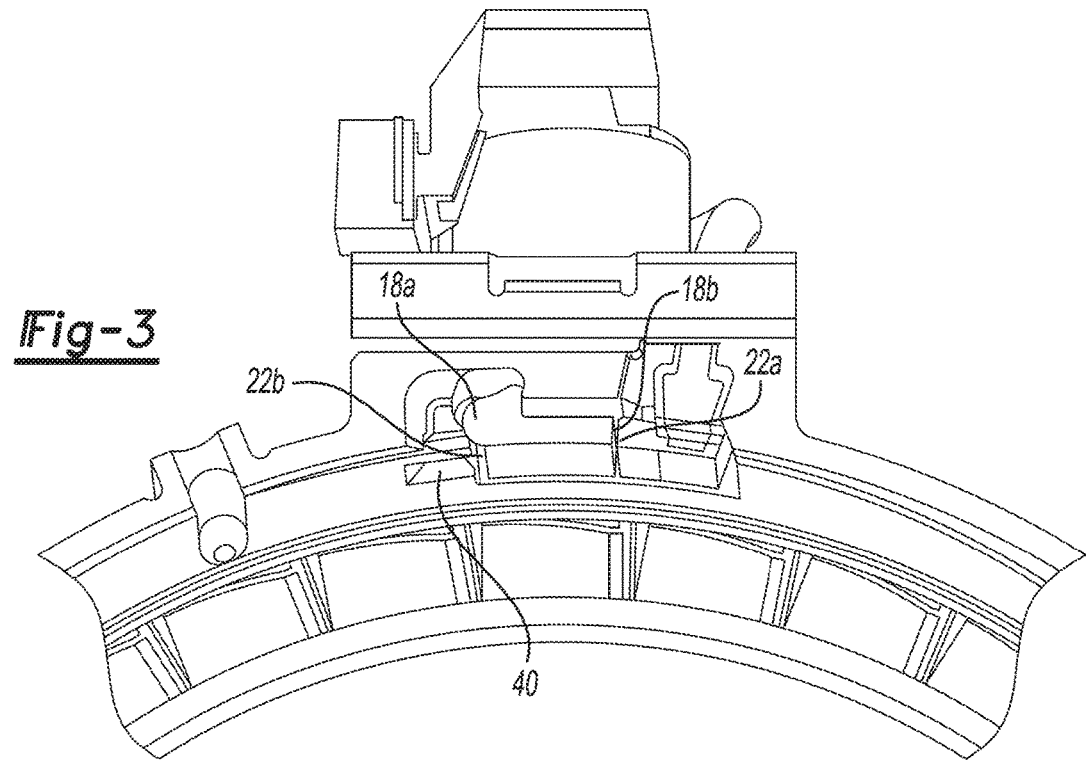
FIG. 3 is a perspective view of a portion of the one-way clutch without the inner race.
Figure 4:
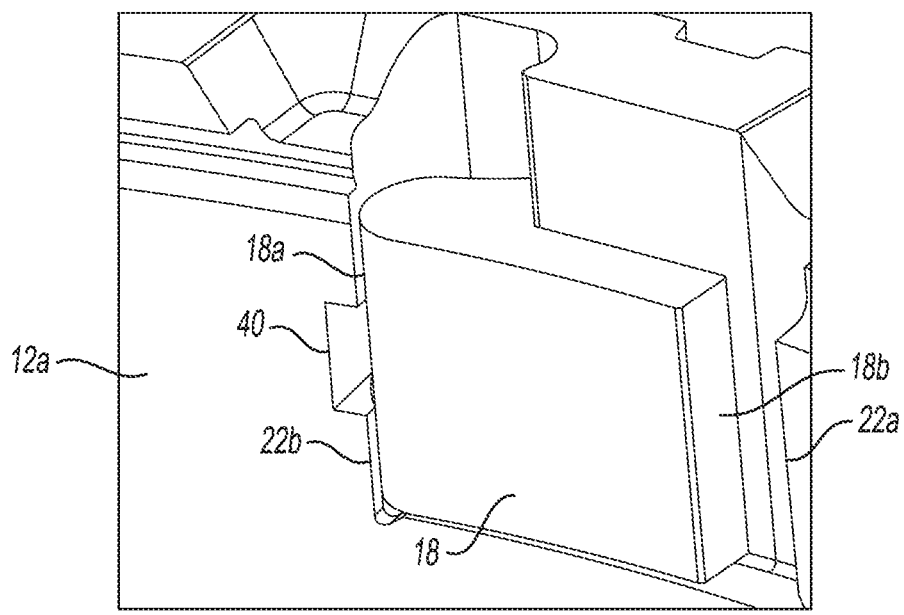
FIG. 4 is a perspective view of a fluid passage defined by a pocket within the outer race.

FIG. 3 and FIG. 4 each illustrate portions of the one-way clutch 10. To illustrate certain portions of the inner periphery 12a of the outer race 12, the inner race 14 is not shown in these views. As previously described, the outer race 12 includes a raised section 20 that defines the pocket 22 that extends to the inner periphery 12a of the outer race 12. The pocket 22 defines a lead edge 22a and a trailing edge 22b. The lead edge 22a and the trailing edge 22b may extend along the axis of rotation A. The trailing edge 22b of the pocket 22 may define a fluid passage 40, such as a notch or slot. The fluid passage 40 may facilitate fluid flow from the inner periphery 12a to a portion of the pocket 22 that is disposed above the rocker 18.

Figure 5:
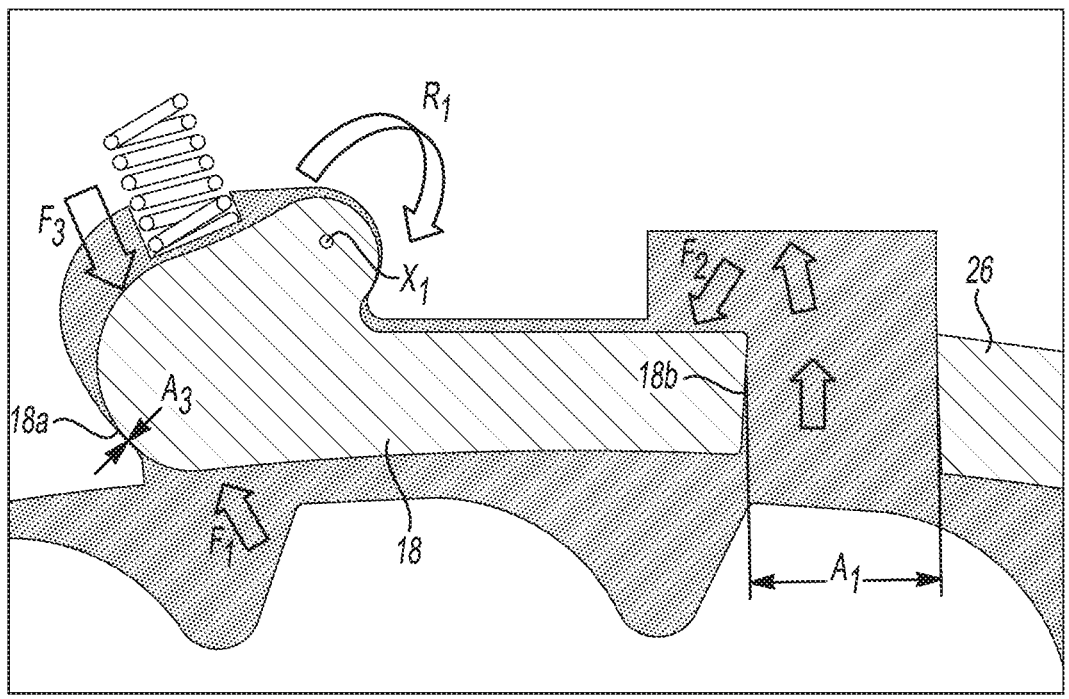
FIG. 5 is a cross-sectional view of a portion of a prior art one-way clutch assembly.
Figure 6:
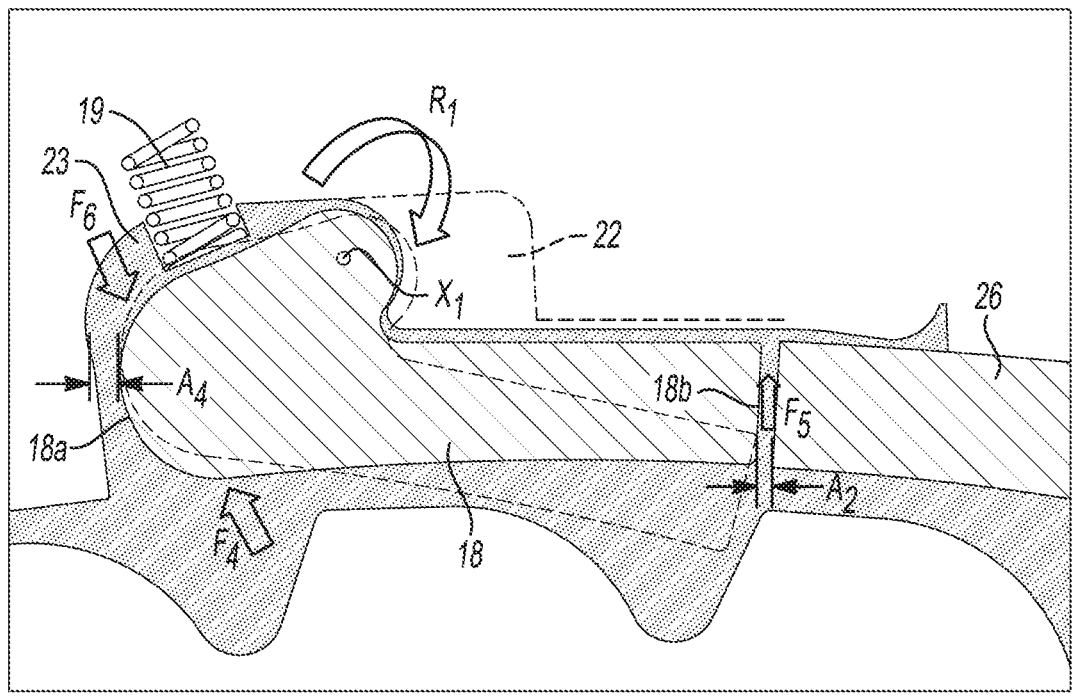
FIG. 6 is a is a cross-sectional view of a portion of the one-way clutch assembly.

FIG. 5 and FIG. 6 each illustrate cross-sectional views of a prior one-way clutch and an exemplary one-way clutch according to one or more embodiments. Teeth 16 of the in the inner annular ring 14 are shown at the bottom of each figure. The rocker or strut 18 may be engaged by a spring xx that biases the distal end 18b of the strut to the disengaged position. As the inner race 14 and teeth 16 rotate (e.g., counter clockwise) fluid moves or is forced in a counter clockwise direction. A force $F_1$ may be applied to a bottom portion of the proximal end of the rocker 18. The force $F_1$ may work against a force applied by the spring. The greater the force $F_1$, the greater the tendency of the rocker 18 to be rotated along the rotational direction $R_1$ to the deployed or engaged position.

Fluid may flow between a distal end 18b of the rocker 18 and the sensor 26. The area between the distal end 18b of the rocker 18 and the sensor 26 may define a cross-sectional area $A_1$. A second force $F_2$ may be applied to an upper portion of the rocker 18, near its distal end 18b. The force $F_2$ of the fluid may be associated with the cross-sectional area $A_1$. In one or more embodiments, the larger the cross-sectional area of $A_1$, the greater the force $F_2$ may be applied to the distal end 18b of the rocker. Fluid may also be provided to an upper portion of the rocker 18 through a second cross-sectional area $A_2$. The fluid provided through the second cross-sectional area $A_2$, may be associated with a force $F_3$. The force $F_3$ may be applied to an upper portion of the proximal end 18a of the rocker 18. The force $F_3$ may bias the distal end 18b of the rocker 18 towards a disengaged or unlocked position.

Referring to FIG. 6, a force F4 may be provided by fluid displaced by the teeth 16. The force F4 may be similar to the force F1 in FIG. 5. Because the cross-sectional area A2 is increased in FIG. 6 to cross-sectional area A4, the force F6 and volume of fluid disposed above the proximal portion 18a of the rocker 18 may increase. The cross-sectional area A3 defined by the area between the distal end 18b of the rocker 18 and the sensor 26 may be decreased as compared to the cross-sectional area A1 shown in FIG. 5. The decreased cross-sectional area A3 may decrease the force F5 applied by the fluid. Likewise, the volume of fluid disposed above the distal portion 18b of the rocker 18 may be decreased. The engaged position is represented by the dashed lines shown in FIG. 6.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A one-way clutch comprising:
an outer race provided with a pocket defining a leading edge and a trailing edge; and
a rocker pivotally connected to the outer race configured to pivot between a disengaged position and an engaged position wherein when in the engaged position a first end of the rocker extends radially inward with respect to the leading edge, wherein a chamber is defined between an upper surface of a second end of the rocker and a portion of the pocket, wherein the trailing edge defines a notch arranged to route fluid from the trailing edge to the chamber, and wherein the chamber is configured to receive the fluid and wherein the received fluid accumulates pressure such that force is applied to the rocker to bias the rocker to the disengaged position, wherein the trailing edge includes a recessed portion, wherein the recessed portion defines the notch.

2. The one-way clutch of claim 1, wherein the notch has a rectangular periphery.

3. The one-way clutch of claim 1, further comprising a blocking member disposed within the outer race adjacent to the first end of the rocker and configured to block fluid from flowing along an upper surface of the first end of the rocker.

4. The one-way clutch of claim 3, wherein the blocking member is a sensor.

5. The one-way clutch of claim 4, wherein the sensor is a hall sensor.

6. The one-way clutch of claim 1 further comprising, a solenoid configured to apply force to the rocker to displace the rocker from the disengaged position to the engaged position.

7. A one-way clutch comprising:
an inner race, provided with an outer circumferential surface defining a tooth, rotatable in a rotational direction;
an outer race defining an inner circumferential surface, arranged concentrically with the inner race, provided with a pocket, wherein the pocket and the inner circumferential surface defines a leading edge and a trailing edge; and
a rocker pivotally connected to the outer race at a pivot point, wherein the rocker is configured to pivot between a tucked position and an engaged position, wherein when in the engaged position, a first end of the rocker extends radially inward with respect to the leading edge, wherein the trailing edge includes a recessed portion, wherein the recessed portion defines a fluid notch extending into the pocket.

8. The one-way clutch of claim 7, further comprising a solenoid configured to apply force to the rocker to displace the rocker from the tucked position to the engaged position.

9. The one-way clutch of claim 7, wherein the outer race comprises a blocking member disposed within the outer race and adjacent to the second end of the rocker configured to block fluid from flowing along an upper surface of the second end of the rocker.

10. The one-way clutch of claim 9, wherein the blocking member is a sensor.

11. The one-way clutch of claim 7, wherein a second end of the rocker and the fluid notch are spaced apart by a first distance defining a first cross-sectional area, and wherein the first end of the rocker and the leading edge are spaced apart by a second distance, defining a second cross-sectional area that is less than the first.

12. A one-way clutch comprising:
an inner race;
an outer race provided with a pocket defining a leading edge and a trailing edge that defines a fluid passage; and
a rocker, including first and second ends, pivotally connected to the outer race, wherein the fluid passage and first end defines a first cross-sectional area and wherein the second end and the leading edge define a second cross-sectional area that is less than the first, wherein the fluid passage is a notch, and wherein the trailing edge includes a recessed portion, wherein the recessed portion defines the notch.

13. The one-way clutch of claim 12, wherein a chamber is defined between an upper surface of the first end of the rocker and a portion of the pocket and wherein the chamber is configured to receive fluid via the fluid passage to bias the rocker to a disengaged position.

14. The one-way clutch of claim 12, wherein the outer race comprises a blocking member disposed within the outer race and adjacent to the second end of the rocker and configured to block fluid from flowing along an upper surface of the second end of the rocker.

15. The one-way clutch of claim 14, wherein the blocking member is a sensor.

16. The one-way clutch of claim 15, wherein the inner race is rotatable in a rotational direction, wherein the outer race surrounds the inner race, and wherein the rocker is pivotally connected to the outer race and configured to pivot from a disengaged position to an engaged position.

17. The one-way clutch of claim 16, wherein the inner race includes an axial strut pivotally connected to a recessed surface defined by the inner race and engaged with an exterior axial plate, and wherein the axial strut is configured to pivot to lock the inner race.

* * * * *